(No Model.) 3 Sheets—Sheet 1.
J. W. FAWKES, Sr.
CULTIVATOR.
No. 474,377. Patented May 10, 1892.
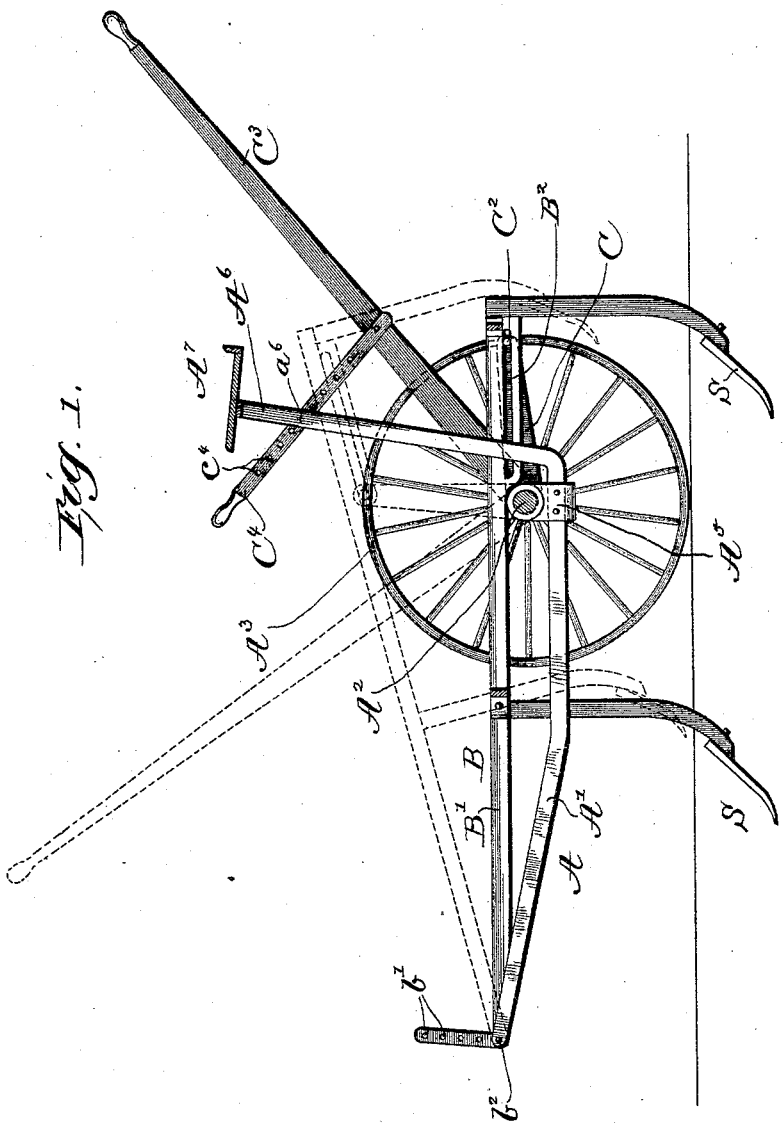

(No Model.) 3 Sheets—Sheet 2.
J. W. FAWKES, Sr.
CULTIVATOR.
No. 474,377. Patented May 10, 1892.
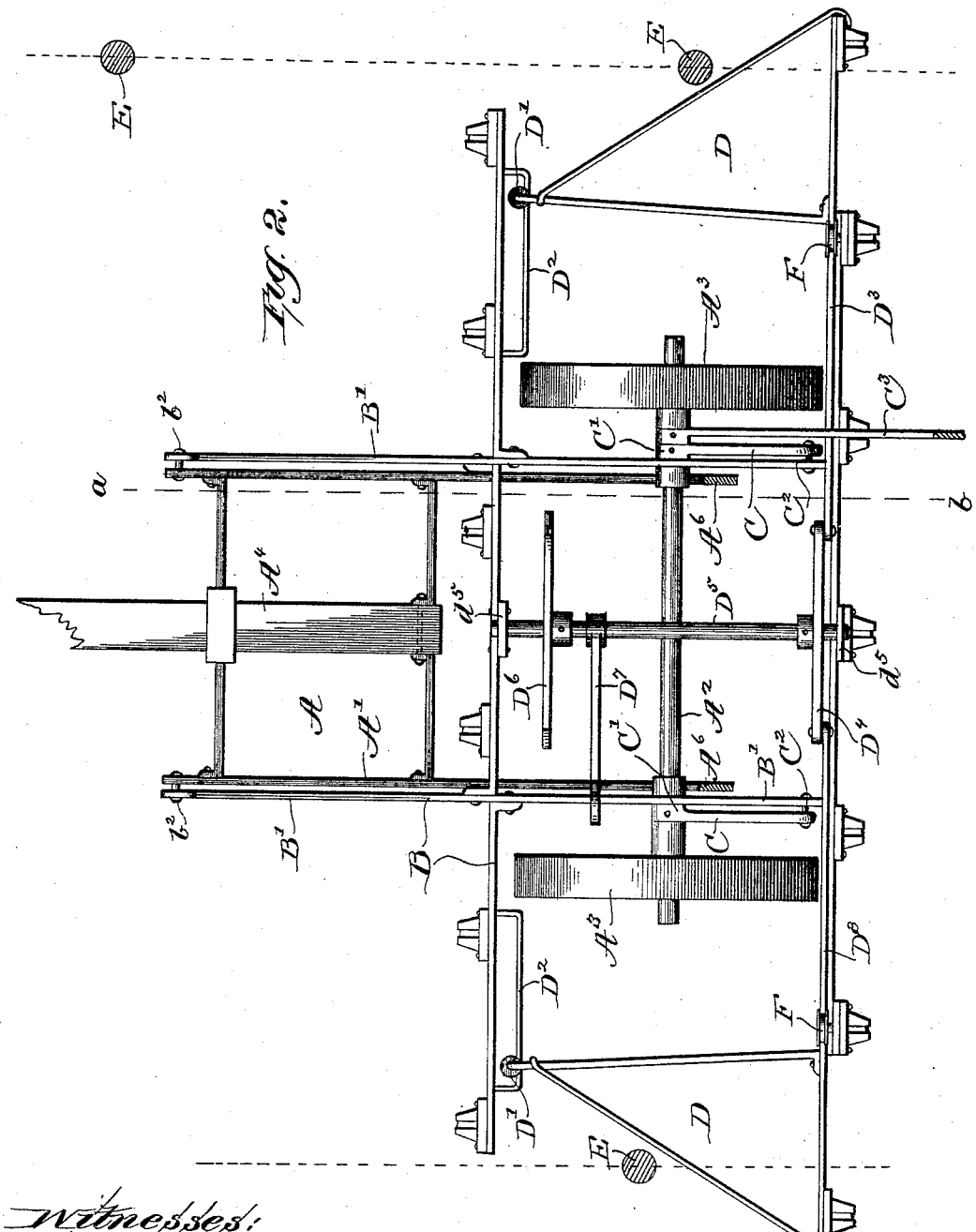
Witnesses:
Ambrose Risdon
Frank L. Stevens,
Inventor
Joseph W. Fawkes Sr
By Cyrus Kehr, Atty

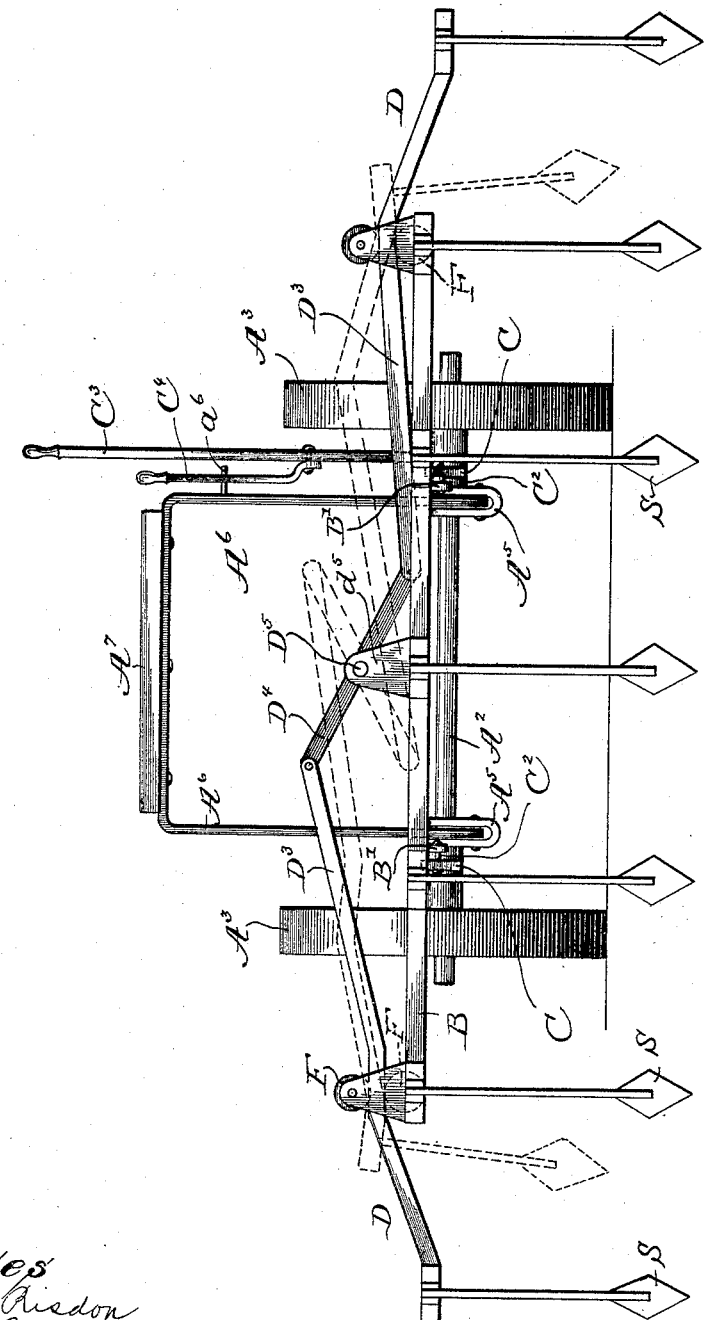

UNITED STATES PATENT OFFICE.

JOSEPH W. FAWKES, SR., OF BURBANK, CALIFORNIA.

CULTIVATOR.

SPECIFICATION forming part of Letters Patent No. 474,377, dated May 10, 1892.

Application filed July 10, 1891. Serial No. 399,010. (No model.)

*To all whom it may concern:*

Be it known that I, JOSEPH W. FAWKES, Sr., a citizen of the United States, residing at Burbank, in the county of Los Angeles and State of California, have invented certain new and useful Improvements in Cultivators; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

One of the objects of my invention is to provide a construction whereby the width of the cultivator may be at the will of the operator or automatically increased or decreased from either or both sides of the machine in order that obstructions in line with either side of the machine may be passed without changing the course of the machine. This feature is designed particularly for application to cultivators to be used in tilling tracts of land planted with rows of trees, such as forest trees or any of the various fruit trees. In many localities the trees themselves require cultivation, while in other cases the space between the trees is used for raising crops of vegetables or grains. In this work it is desirable to turn or dig the ground between the trees as well as between the rows. So far as I am informed there has not been prior to my invention a machine adapted to perform this work completely.

Another object of my invention is to provide a construction embodying a more efficient provision than has heretofore been used for moving the shovels of the cultivator into and out of the ground and regulating the height at which the shovels shall stand when in or out of the ground.

In the accompanying drawings, Figure 1 is a vertical section in line $a$ $b$ of Fig. 2, looking toward the right. Fig. 2 is a plan of the machine, the driver's seat and the support for the same being removed and the upper portion of the lever for lifting the shovel-frame being also removed. Fig. 3 is a rear elevation.

A is the carriage, consisting of the frame $A'$, axle $A^2$, wheels $A^3$, and tongue $A^4$, the frame $A'$ being joined to the axle $A^2$ by extending through ears $A^5$. From the rear of the frame $A'$ rise one or more supports $A^6$, to the upper end of which is attached the driver's seat $A^7$.

Upon the carriage A is supported the main shovel-frame B, said frame being preferably extended an equal distance to the right and left of the frame A. At the front said frame B has a bar $B'$, extending forward at each side of the frame $A'$, and each of said bars is turned in a substantially-vertical plane at its front end and provided with a series of holes $b'$. A bolt or pin $b^2$ extends through one of said holes $b'$ and through a portion of the front of the frame $A'$. Thus the frame B is hinged to the frame $A'$. By placing the bolt $b^2$ through the lowermost hole $b'$ the front of the frame B is raised to its highest limit, and by placing said bolt through any one of the holes $b'$ above the lowermost, the front of said frame is correspondingly lowered and the shovels set for correspondingly-deeper plowing.

C C are arms located at each side of the frame $A'$ and having at one end a hub $C'$, surrounding and keyed to the axle or shaft $A^2$ and having the other end extending rearward and provided with a wrist-pin $C^2$, resting in a slot $B^2$ in the bar $B'$ of the frame B. At one side of the seat $A^7$ is located a hand-lever $C^3$, having one end surrounding and keyed to the axle $A^2$, and rising so as to be readily engaged by the driver. The radial arrangement of the arms C and the lever $C^3$ upon the axle $A^2$ is preferably such as that the lever $C^3$ will be extended rearward of the seat $A^7$, while the arms C are directed rearward in a nearly horizontal position and the frame B is at its lower limit of movement. It will be seen that if the lever $C^3$ is now thrown forward the wrist-pins $C^2$ on the arms C will be raised, and said pins will carry the rear end of the frame B upward in the arc of a circle of which the bolt $b^2$ at the front of said frame B is the seat. Thus the shovels S may be lifted completely out of the ground, the highest limit being approximately attained when the lever $C^3$ has been turned forward sufficiently far to bring the arms C into the vertical position, as shown by dotted lines in Fig. 1. It will be seen, also, that the shovels S may be held at any position between their higher and lower limit of movement by arresting the movement of the lever $C^3$ at the required point. This may be done manually or by a suitably-graduated locking mechanism. For this purpose I have provided the lever $C^4$, which is secured by one end to the lever $C^3$, and extends past one of the supports $A^6$, and is provided with a series of holes $c^4$, fitted to receive a pin $a^6$, extending laterally from the adjacent support $A^6$. It is obvious that if the lever $C^3$ be raised so that the pin $a^6$ may enter the lowermost hole $c^4$ in the lever $C^4$ the frame B may be locked at the lower limit to which the locking mechanism is adapted, and when the lever $C^3$ is lowered so that the pin $a^6$ enters the uppermost hole $c^4$ the locking mechanism is locked at the lowest limit to which the locking mechanism is adapted, and if the pin $a^6$ be made to enter any one of the holes $c^4$, intermediate between the lowermost and the uppermost of said holes, the lifting mechanism will be locked with the shovels S at a corresponding elevation. The lever $C^4$ may be so attached to the lever $C^3$ as to be sprung against the adjacent support $A^6$, so that if the pin $a^6$ is made to enter one of the holes $c^4$ the engagement so effected will remain.

From the foregoing it will be seen that I have provided a double adjustment for the depth of the shovels. There is, first, a lifting mechanism at the shaft $A^2$, and, second, an adjustable attachment forward of said axle and at the junction of the frame B with the frame A'.

D D are supplemental laterally-adjustable shovel-sections supported by the shovel-frame B. Each of said frames is shown as having one shovel S; but more shovels may be applied to said frames, if desired. Each of said supplemental frames extends laterally beyond the frame B sufficiently to allow said frame B to move in a line parallel to a row of trees E without coming into contact with said trees while said supplemental section D reaches into the line of said row. At the front said section D has a roller D', arranged in a horizontal plane and in front of a track-bar $D^2$, supported by the frame B. In the construction shown by the drawings there is no other engagement for the front of the section D than the engagement afforded between said roller D' and said track-bar $D^2$, and this may be regarded as a shiftable pivot. At the rear of said supplemental frame is a bar $D^3$, extending laterally over the frame D to a point near the line extending from front to rear through the middle of the machine. At such point the ends of the two bars $D^3$ are hinged to the opposite ends of the cross-arm $D^4$, and through the middle of said cross-arm $D^4$ extends a rock-shaft $D^5$, which is mounted parallel to the line of motion of the machine and supported immovably in suitable bearings $d^5$, rising from the frame D. Each of the bars $D^3$ extends between a pair of guide-rollers F, suitably mounted upon a frame B. By turning the rock-shaft $D^5$ the cross-arm $D^4$ may be turned upon the axis of said rock-shaft and the ends of said cross-arm moved toward the vertical plane in which said rock-shaft lies. By this means the arms $D^3$ and the supplemental sections D are drawn toward the middle of the machine, the arms $D^3$ passing between the guide-rollers F and the front of the section D being carried on the track-bars $D^2$ and rollers D'. The distance through which said supplemental sections may be thus drawn is to be made sufficient to cause said sections to move out of the line of the trees E. Said rock-shaft $D^5$ may be rocked by the feet of the driver resting upon the cross-arm $D^6$, secured at right angles to said rock-shaft at the front of the seat $A^7$. It will be seen that by reversing the movement of the rock-shaft already described the ends of the cross-arm $D^4$ will recede from the said vertical plane and push the arms $D^3$ and supplemental sections D laterally away from said plane until said sections reach into the line of the trees E. If so desired, the rock-shaft $D^5$ may be provided with a suitable hand-lever $D^7$, as indicated in Fig. 2, whereby said rock-shaft may be actuated by the hand of the driver. Said hand-lever $D^7$ may be attached to the rear of the shaft $D^5$, so that it may be reached while the operator is walking behind the machine.

The attachment between each shovel of the supplemental frames D and said frames may be shorter than the normal distance between the upper extremity of the lower roller F and the ground, so that when said frames are drawn inward to the inner limit upon said rollers F the shovels supported by said frames D cannot extend into the ground. If said attachment is thus shortened, said frames must be adapted to dip or extend obliquely downward when extended from the support on the main frame. This is accomplished, as shown in the drawings, by setting the frames D and arms $D^3$ out of line sufficient to cause the frames D to set in the oblique position shown in Fig. 3 when extended. This dipping might also be accomplished by putting the arm $D^3$ in the same planes with the frames D and providing connections for the inner ends of the arms $D^3$ at a higher elevation than the supports of the frames D and at F.

It is to be noted that the sections D are to be thrown into their extended position by the operator, and held in such extended position until a tree is approached, and then drawn toward the middle of the machine by the operator; but the construction is such that if the operator fails to shift the sections D toward the middle of the machine upon approaching a tree, upon the engagement of the latter with the oblique side of the frame D, the latter will be forced toward the middle of the machine by said tree without stopping the progress of or injuring the machine.

It is obvious that the machine may be constructed with only one of the supplemental sections D and with only one arm reaching from the rock-shaft $D^5$ to such supplemental section; but since in ordinary work the machine at times moves along a row of trees at one side and then at the other, I deem it best to construct the cultivator with the two supplemental shovel-sections. It is to be observed that the manner of applying and actuating these supplemental sections may be considerably varied without departing from the spirit of my invention.

I claim as my invention—

1. In a cultivator, the combination, with a main shovel-frame, of a lateral supplemental shovel-section joined at its front to said main frame by a shiftable pivot connection, whereby the front of said supplemental section may be shifted toward and from the middle of the machine, substantially as shown and described.

2. In a cultivator, the combination, with a main shovel-frame, of a supplemental shovel-frame located at each side of and supported at its front and rear by said main shovel-frame on suitable guides, and suitable shifting mechanism engaged with said supplemental section for shifting the latter toward and from the middle of the machine, substantially as shown and described.

3. In a cultivator, the combination, with a main shovel-frame, of a lateral supplemental shiftable shovel-section, a rock-shaft, and suitable connection between said rock-shaft and said supplemental section, whereby said supplemental section may be shifted toward and from the middle of the machine by the rotation of said rock-shaft, substantially as shown and described.

4. In a cultivator, the combination, with a main shovel-frame, of a supplemental shovel-frame supported by and at each side of said main shovel-frame on suitable guides, a rock-shaft, and suitable connection between said rock-shaft and said supplemental section, whereby said supplemental section may be drawn toward and from the middle of the machine by the rotation of said rock-shaft, substantially as shown and described.

5. In a cultivator, the combination, with a main shovel-frame, of a supplemental frame supported by said main shovel-frame at each side of the latter on suitable guides, and a rotatable cross-arm joining said supplemental section to said main shovel-frame, substantially as shown and described.

6. In a cultivator, the combination, with a main shovel-frame, of a lateral supplemental shiftable shovel-section, a rock-shaft, and suitable connection between said rock-shaft and said supplemental section, whereby said supplemental section may be shifted toward and from the middle of the machine by the rotation of said rock-shaft, and a suitable device attached to said rock-shaft for turning the latter or holding it in a fixed position, substantially as shown and described.

7. In a cultivator, the combination, with a main shovel-frame, of a supplemental shovel-frame supported by and at each side of said main shovel-frame on suitable guides, a rock-shaft, and suitable connection between said rock-shaft and said supplemental section, whereby said supplemental section may be drawn toward and from the middle of the machine by the rotation of said rock-shaft, and a suitable device attached to said rock-shaft for turning the latter or holding it in a fixed position, substantially as shown and described.

8. In a cultivator, the combination, with a main shovel-frame, of a supplemental shovel-frame supported by and at each side of said main shovel-frame on suitable guides and being oblique at the sides farthest from the middle of said main shovel-frame, the portions of said oblique sides at the rear of said supplemental sections being farthest from the middle of said main shovel-frame, a rock-shaft, and suitable connection between said rock-shaft and said supplemental section, whereby said supplemental section may be drawn toward and from the middle of the machine by the rotation of said rock-shaft, substantially as shown and described.

9. In a cultivator, the combination, with a main shovel-frame, of a supplemental frame supported by said main shovel-frame at each side of the latter on suitable guides and being oblique at the side farthest from the middle of said main shovel-frame, the portion of said oblique side at the rear of said supplemental section being farthest from the middle of said main shovel-frame, and a rotatable cross-arm joining said supplemental section to said main shovel-frame, substantially as shown and described.

10. In a cultivator, the combination, with the main shovel-frame, of the lateral supplemental shovel-frame having both ends supported upon the main frame upon suitable guides and having a shovel extending downward, the attachment of said shovel to said frame being shorter than the normal distance between the rear support upon the main frame and the ground, and suitable mechanism for shifting said supplemental frame upon said guides, substantially as described.

11. In a cultivator, the combination, with a frame B, having the track-bar $B^2$ and guide-rollers F, of supplemental, shiftable, and oblique shovel-sections D, having rollers $D'$, resting on said track-bars, and bars $D^3$, resting between the guide-rollers F, a rock-shaft $D^5$, and suitable connection between said rock-shaft and the bars $D^3$, and a suitable device rigidly connected with said rock-shaft for turning the latter, substantially as shown and described.

12. In a cultivator, the combination, with a suitable carriage, of a main shovel-frame, a supplemental shovel-frame supported by said main shovel-frame at each side of the latter on suitable guides, and a rotatable cross-arm joining said supplemental section to said main shovel-frame, substantially as shown and described.

13. In a cultivator, the combination, with a suitable carriage, of a main shovel-frame, a lateral, supplemental, and shiftable shovel-section, a rock-shaft, and suitable connection between said rock-shaft and said supplemental section, whereby said supplemental section may be shifted toward and from the middle of the machine by the rotation of said rock-shaft, and a suitable device attached to said rock-shaft for turning the latter or holding it in a fixed position, substantially as shown and described.

14. In a cultivator, the combination, with a frame B, having the track-bar $D^2$ and guide-rollers F, of supplemental, shiftable, and oblique shovel-sections D, having rollers D', resting on said track-bars, and bars $D^3$, resting between the guide-rollers F, a rock-shaft $D^5$, and suitable connection between said rock-shaft and the bars $D^3$, and a suitable device rigidly connected with said rock-shaft for turning the latter, substantially as shown and described.

In testimony whereof I affix my signature, in presence of two witnesses, this 2d day of July, in the year 1891.

JOSEPH W. FAWKES, Sr.

Witnesses:
  A. W. SEAVER,
  GEO. W. M. REED.